March 27, 1934.    L. G. SIMJIAN    1,952,337
POSE REFLECTING BOOTH
Filed July 2, 1931

INVENTOR
LUTHER G. SIMJIAN.
BY
Herbert H. Thompson
HIS ATTORNEY.

Patented Mar. 27, 1934

1,952,337

UNITED STATES PATENT OFFICE 1,952,337

POSE REFLECTING BOOTH

Luther G. Simjian, New Haven, Conn.

Application July 2, 1931, Serial No. 548,317

7 Claims. (Cl. 45—99)

This invention relates to pose reflecting systems or apparatus particularly adapted for self-photography. In such apparatus it is highly desirable that the poser be able to obtain a view of his face from several different angles, such as a full face view, a semi-profile, and full profile from each side. It has heretofore been proposed to provide a side mirror for each separate profile view desired. This has the disadvantage, however, that when the outer side mirrors are used the intermediate side mirror or mirrors is in the line of sight between the outer mirror and the central mirror so that it is necessary to provide means to remove the intermediate mirror or mirrors from this line of sight. According to the present invention, I overcome this difficulty by employing only one side reflecting mirror on each side and providing means whereby said mirror may be moved so as to give the different profile views desired. This may be accomplished by moving the side mirror toward and away from the central mirror and preferably simultaneously changing the angular position thereof to the proper angle for each position. This has the advantage of giving any desired number of profile views and also of making the apparatus lighter and simpler so that it may be made portable. Also, instead of employing shutters and windows for the side mirrors, I prefer in this instance to provide an endless concealing band having an aperture lying in front of the mirror and movable with the mirror so that the aperture always lies in front thereof. This renders shutters unnecessary.

Referring to the drawing in which one form of the invention is shown,

Figure 1:
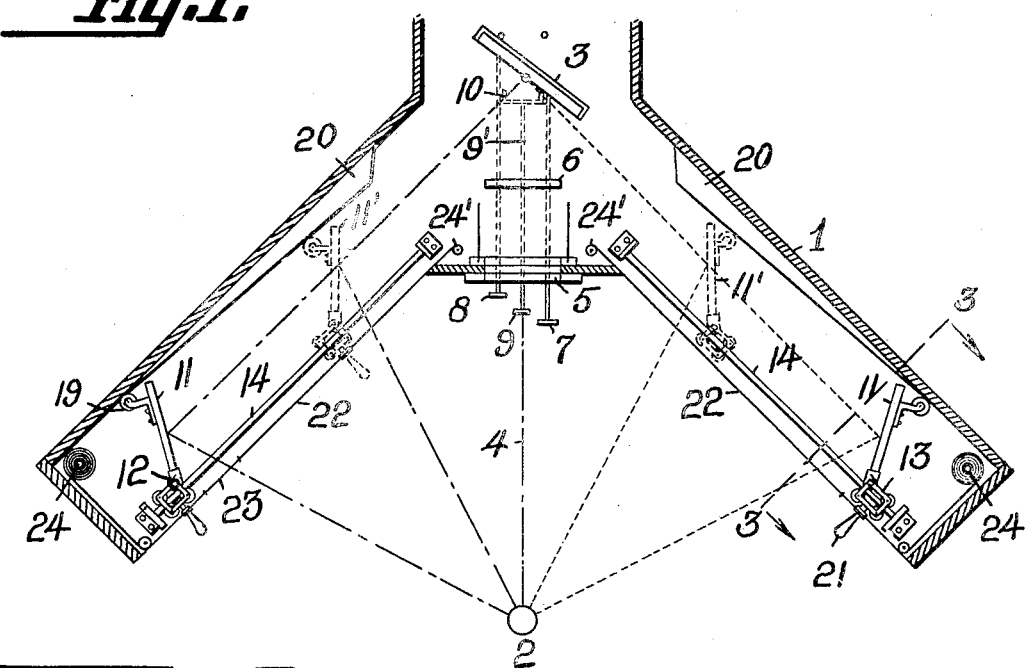
Fig. 1 is a horizontal section through the pose-reflecting booth showing the mirror system.

As in my prior application for Pose reflecting booths, filed June 4, 1931, Serial No. 542,070 I provide a housing 1 of angular shape, the poser sitting in a central position 2. The central or full face mirror 3 is placed at the apex angle so that the poser may look directly forward along the dot and dash line 4 and through the window 5 and obtain a direct front view of his face. If desired, an image reducing lens 6 may be provided between the poser and the mirror. The camera (not shown) is usually located in back of the mirror, the picture being taken by self-photography in the manner described and claimed in my prior Letters Patent No. 1,709,508 dated April 16, 1929 by dropping the mirror out of position or otherwise. In order to obtain the profile views, the central mirror 3 is preferably rotatably mounted so that it may be turned either to the right or to the left as shown in Fig. 1 by pushing on the knob 7 or 8 as the case may be. The central knob 9 is provided for centralizing the mirror, the rod 9' on this knob having a fork 10 at the end thereof for this purpose. A single profile mirror 11 is shown at each side of the central mirror.

Figure 2:
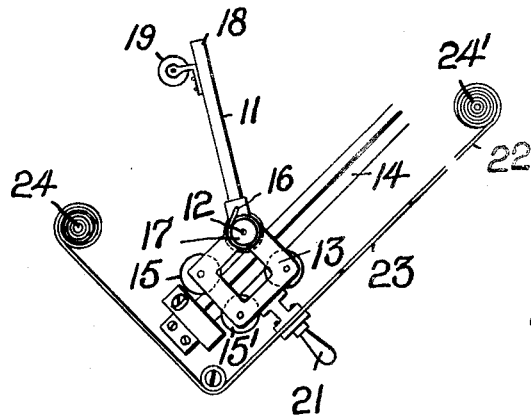
Fig. 2 is an enlarged plan view of one of the side mirrors with the movable carriage supporting the same.
Figure 3:
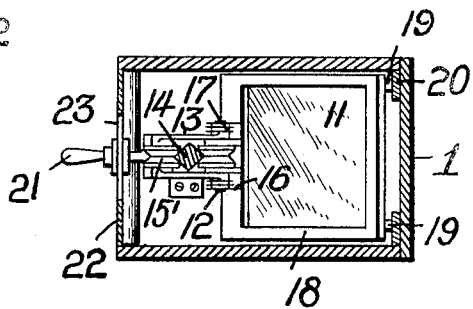
Fig. 3 is a sectional view along the line 3—3 of Fig. 1.

Each profile mirror is shown as pivotally mounted at 12 on a roller carriage 13, the latter being adapted to roll along a trackway 14. Said trackway is shown as in the form of a rod having a diamond shaped or square cross section, the rollers 15—15' being grooved for this purpose. Coil springs 16 are provided around short hubs 17 extending from either side of the carriage. One end of said springs is attached to the carriage and the other end bears on the frame work 18 supporting the mirror, the springs acting to turn the mirror counter-clockwise in Fig. 2. On the back of the mirror frame is a pair of rollers 19 which are normally pressed against a cam surface 20 on the back of the frame 1. This surface is so shaped that as the mirror 11 is moved toward and away from the central mirror 3, the mirror 11 is continually turned to the proper angle so that the poser may see his profile in the mirror, the angle of the profile being varied from point to point (see dotted line position 11' in Fig. 1). The mirror is preferably moved by a handle 21 secured to the carriage 13.

In order to close the front of the box 1, I provide a concealing curtain or band 22 which has a window or aperture 23 therein in front of the mirror 11. Instead of providing a plurality of shutters and windows as in my prior invention, I prefer to move the curtain with the mirror so that the same aperture remains effective and the remainder of the apparatus remains concealed. For this purpose the handle 21 is shown as secured to the curtain 22 so that the curtain is carried with the carriage 13 as it is moved. The curtain is preferably wound at each end on spring rewind rollers 24—24' so as to take up slack. It will be understood that a similar mirror system may be provided on the opposite side as shown.

It will be readily apparent that by my invention a large number of different views may be obtained by a very simple mechanism, since the mirror 11 may be stopped in any desired position.

My invention also eliminates the necessity for employing separate shutters for each window and for providing means for moving the intermediate profile mirrors out of the way when the outer profile mirrors are in use.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a multi-pose reflecting system, a central direct reflecting mirror, a second mirror on a side thereof in which the poser may see his profile by double reflection, a concealing band with an aperture therein in front of said side mirror, and means for moving said side mirror and band together to vary the profile angle.

2. In a multi-pose reflecting system, a central direct reflecting mirror, mirrors on the sides of said central mirror in which the poser may see his profile by multiple reflection therein and in said central mirror, a concealing band in front of said side mirrors, an aperture therein, and means for moving said band to move said aperture toward and away from said central mirror.

3. In a multi-pose reflecting system, a central direct reflecting mirror, a second mirror on a side thereof in which the poser may see his profile by double reflection, a sliding carriage, means whereby said carriage may be moved toward and away from the central reflector, means pivotally mounting said side mirror on said carriage, and a cam for altering the angular position of said mirror on said carriage as the latter is moved.

4. In a multi-pose reflecting system, a pair of spaced, angularly positioned mirrors in one of which a poser may see his image as reflected from the other mirror, a guide or trackway between said mirrors, means whereby the first mentioned mirror may be moved along said guideway, and means in the path of movement of said mirror for simultaneously adjusting the angular position of said movable mirror to maintain the image of the poser automatically in view.

5. In a multi-pose reflecting system, a central direct reflecting mirror, mirrors on the sides of said central mirror in which the poser may see his profile by multiple reflection therein and in said central mirror, guide-ways permitting movement of said side mirrors toward and away from the central mirror, means for moving said side mirrors along said guides and a cam surface in the path of movement of each mirror to alter the angular position thereof as it is moved.

6. In a multi-pose reflecting system for self-photography, a central direct reflecting mirror mounted for rotation about a fixed axis, a second mirror on a side thereof in which the poser may see his profile by double reflection, means for translating said side mirror toward and away from said central mirror to vary the profile angle without shifting the axis of said central mirror, and automatic means for varying the angular position of said second mirror as it is translated to maintain the image of the poser in view without his moving.

7. In a multi-pose reflecting system, a central direct reflecting mirror, a second mirror on a side thereof in which the poser may see his profile by double reflection, a trackway along which said side mirror may be translated toward and away from said central mirror to vary a profile angle, and automatic means adjacent said trackway to simultaneously vary the angle of said mirror to maintain the image of the poser in view without his moving.

LUTHER G. SIMJIAN.